(12) United States Patent
Smith et al.

(10) Patent No.: US 12,265,737 B2
(45) Date of Patent: Apr. 1, 2025

(54) COMMAND TAGS

(71) Applicant: DELL PRODUCTS L.P., Round Rock, TX (US)

(72) Inventors: Erik Smith, Douglas, MA (US); David Black, Acton, MA (US); Boris Glimcher, Brooklyn, NY (US); Vinay Rao, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/334,988

(22) Filed: Jun. 14, 2023

(65) Prior Publication Data
US 2024/0256181 A1    Aug. 1, 2024

(30) Foreign Application Priority Data
Jan. 30, 2023    (IN) .............................. 202311005988

(51) Int. Cl.
*G06F 3/06* (2006.01)

(52) U.S. Cl.
CPC .......... *G06F 3/0659* (2013.01); *G06F 3/0679* (2013.01); *G06F 3/0604* (2013.01)

(58) Field of Classification Search
CPC ..... G06F 3/0659; G06F 3/0679; G06F 3/0604
USPC .................................................. 711/154, 100
See application file for complete search history.

(56) References Cited

U.S. PATENT DOCUMENTS

| | | | |
|---|---|---|---|
| 2011/0131375 A1* | 6/2011 | Noeldner | G06F 13/28 711/E12.001 |
| 2022/0377054 A1* | 11/2022 | Shukla | H04L 9/3226 |

OTHER PUBLICATIONS

Nvm Express, "Rapid Path Failure Recovery (TPAR 8028)," Dell Technologies, Dec. 2022. (11pgs).
Nvm Express, "Base Specification," Revision 2.0a, Jlu 2021. (454pgs).
Nvm Epress, NVM Express® Technical Proposal for New Feature, 2008-2024 NVMe Corporation. (31pgs).
Nvm Epress, NVMe Technical Proposal Authorization Request, May 2023. (4pgs).

* cited by examiner

*Primary Examiner* — Hosain T Alam
*Assistant Examiner* — Zubair Ahmed
(74) *Attorney, Agent, or Firm* — BAUGH LAW, LLC

(57) ABSTRACT

Embodiments of using command tags are described to prevent data corruption in a multi-path network in an NVMe over Fabrics (NVMe-OF) environment. A command tag is incorporated in a written command send from a host for command identification. Once the host detects an issue of a first link between the host and namespace, the host may immediately send, using a second link, a retry of a command that was previously sent by the host to a first controller via the first link. The retry of the command comprises the same command tag which allows the first and second controllers to detect an execution condition of the first write command, and thus avoiding repeat execution of the first write command by the first controller and the second controller. Therefore, data corruption may be addressed efficiently to the root cause.

20 Claims, 13 Drawing Sheets

COMMAND TAGS

CROSS-REFERENCE TO RELATED APPLICATION

This patent application is related to and claims priority benefit under 35 U.S.C. § 119 to Indian Pat. App. Ser. No. 202311005988, filed on 30 Jan. 2023, entitled "COMMAND TAGS," and listing Erik Smith, David Black, Boris Glimcher, and Vinay Rao as inventors, which patent document is incorporated by reference herein in its entirety and for all purposes.

BACKGROUND

A. Technical Field

The present disclosure relates generally to information handling systems. More particularly, the present disclosure relates to command handling in a multi-path network.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a multi-path network, data corruption is a risk when multipathing software, e.g., Dell PowerPath™, and non-volatile memory express (NVMe) over Fabrics (NVMe-oF) are involved. Data corruption may be related to stale data overwriting newer data and impact any subsystem type, e.g., PowerFlex™, PowerMax™, or PowerStore™. Theoretically, data corruption may happen any time when NVMe-oF is being used in various scenarios, e.g., NVMe/Transmission Control Protocol (TCP), NVMe/Fibre Channel (FC), NVMe/Remote Direct Memory Access (RDMA) over Converged Ethernet (ROCE), etc.

Accordingly, it is highly desirable to find new, more efficient ways to prevent data corruption in a multi-path network.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
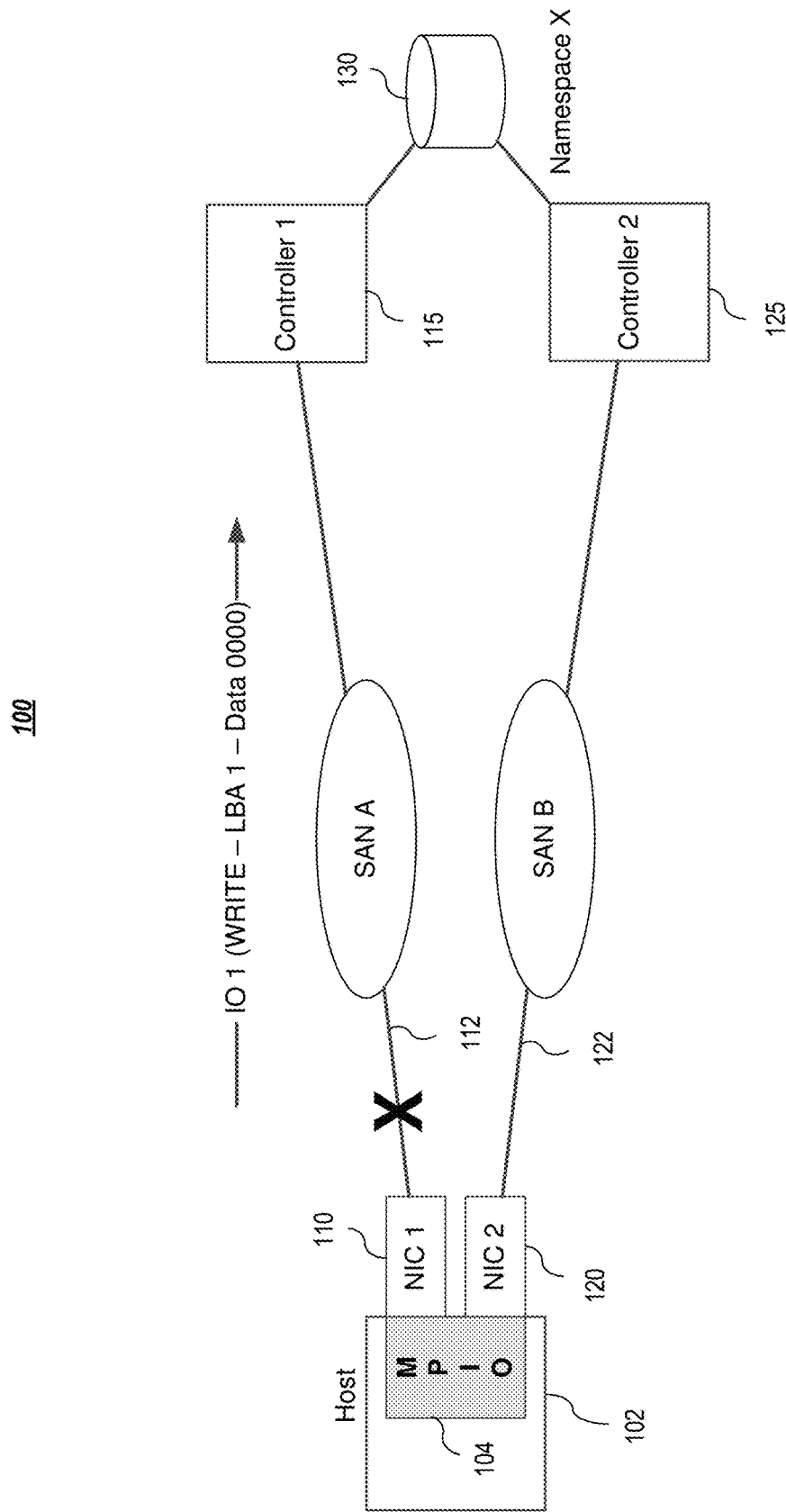
FIG. 1 graphically depicts a multi-path network having a first path down after a host sending a write command to a controller.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Introduction

In a multi-path network, data corruption is a risk when multipathing software, e.g., Dell PowerPath™, and NVMe-oF are involved. Data corruption may be related to stale data overwriting newer data and impact any subsystem type, e.g., PowerFlex™, PowerMax™, or PowerStore™. Theoretically, data corruption may happen any time when NMVe-oF is being used in various scenarios, e.g., NVMe/TCP, NVMe/FC, NVMe/ROCE, etc.

FIG. 1 graphically depicts a multi-path network having a first path down after a host sends a write command to a controller. The host 102 has multi-path I/O (MPIO) software 104, e.g., PowerPath™, to support load balancing and path failover between a first network interface controller (NIC) 110 and a second NIC 120. The host 102 may access a non-volatile memory (NVM) subsystem comprising a Namespace X 130, via a first path 112 between the first NIC 110 and a first controller 115 or a second path 122 between the second NIC 120 and a second controller 125. The first controller 115 and the second controller 125 are both associated with the same NVM subsystem for access control via the first path and the second path, respectively. In one or more embodiments, the first controller 115 and the second controller 125 are NVMe controllers that support NVMe interface specification for accessing non-volatile storage medium or media via a peripheral component interconnect express (PCIe) bus. In one or more embodiments, the first path 112 may involve a first storage area network (SAN) (also referred to as "SAN A" as shown in FIG. 1) and the second path 122 may involve a second SAN (also referred to as "SAN B" as shown in FIG. 1).

As depicted in FIG. 1, the host 102 sends, via the first path 112, a first write command IO 1 for data writing in the Namespace X. The first write command IO 1 comprises a first data block (e.g., "0000") and a Logical Block Address (LBA) indicating where to write the first data block. Sometime after the first write command IO 1 and data was sent, but before the first controller 115 responds with a status for the command, the host 102 notices the first path 112 between the first NIC 110 and the first controller 115 has dropped.

Figure 2:
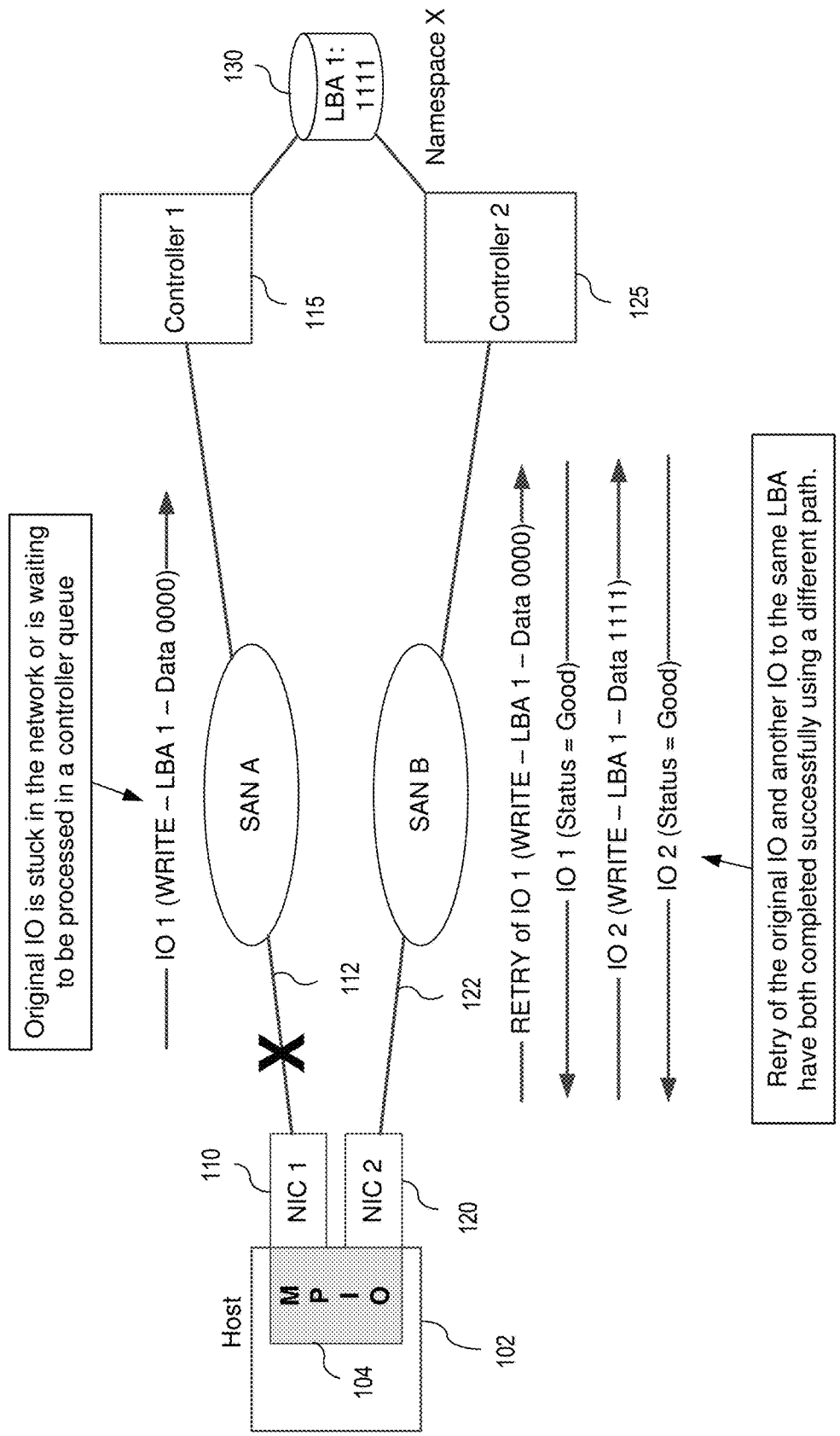
FIG. 2 graphically depicts the host re-sending the write command on a second path to a second controller.

FIG. 2 graphically depicts the host re-sending the write command on a second path to a second controller. Once the host 102 detects an error with the first path 112, the host may send a retry of the first write command IO 1 on a second path 122. Unbeknownst to the host, the original first write command IO 1 and associated data may still be in flight, e.g., stuck in a queue on the first path 112 or stuck in processing at the first controller without having written the data. Upon receiving the retry of the first write command, the second controller 125 completes it immediately by writing the first data block at a logical block address (LBA) associated with the namespace X 130 and sends a first confirmation indicating an execution status (e.g., Good) of the retried first write command back to the host 102. This allows the host to send a second write command IO2, which comprises a second data block (e.g., "1111") and an LBA the same as the LBA in the IO 1 to write the second data block. The second controller 125 completes the IO2 with the second data block written at the LBA and sends a second confirmation indicating an execution status (e.g., Good) of the IO2.

Figure 3:
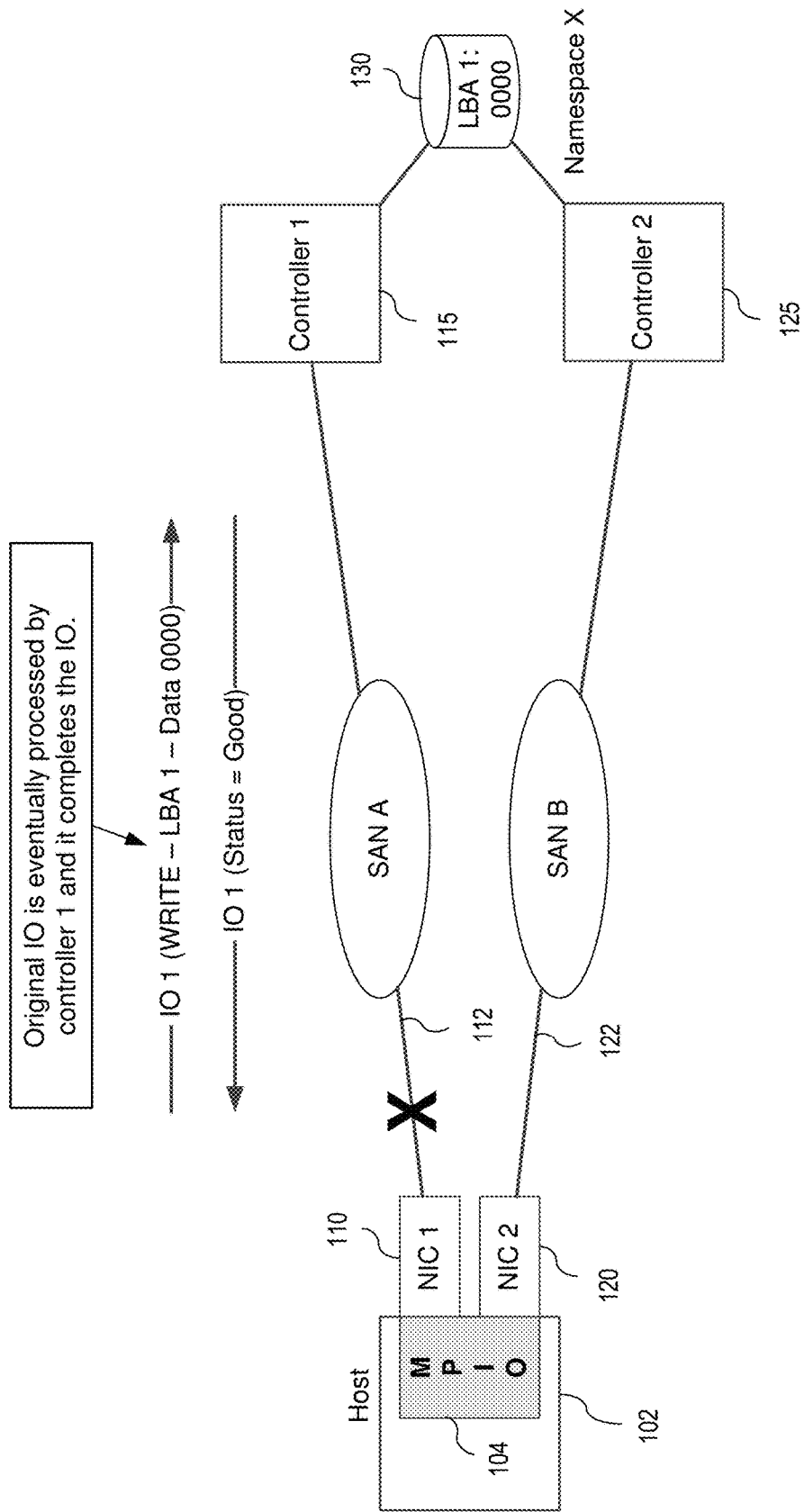
FIG. 3 graphically depicts data corruption occurring after the write command is subsequently processed by the first controller.

FIG. 3 graphically depicts data corruption occurring after the original write command is subsequently processed by the first controller. When the original first write command IO 1 is eventually processed by the first controller 115, the first data block (e.g., "0000") is written again at the LBA. As a result, the second data block 2 (e.g., "1111") written in the LBA is overwritten with the first data block from the original first written command IO 1. Such an overwriting represents data corruption because the data block in the LBA should not be the first data block after the second write command is implemented.

A timeout mechanism might be used to provide a workaround to prevent the original command from being retried down a different path until it is certain to have timed out either in the network or within the controller itself. However, one issue with such an approach is choosing the right length of timeout to prevent data corruption from happening without requiring a long error recovery process. Solutions to address this concern have focused on shortening the amount of time needed to detect a loss of connectivity and increasing the total timeout length. Keep-Alive Timeout involves a lengthy wait for a failure that the host detects immediately (e.g., host cable-pull). The host may have to wait for 2× or 3× of the timeout period to ensure that the controller has declared a Keep-Alive Timeout. A host must then wait for the controller to quiesce I/O processing before it can safely retry any I/Os. Both the Keep-Alive Timeout period and the command quiesce time (CQT) may be specific to the NVMe subsystem. Determining appropriate values to use, particularly for CQT, requires storage testing. Furthermore, if the total wait time is too short, data corruption is still possible.

Another problem with this timeout mechanism approach is that it is only a workaround. While it may prevent the issue from happening, it does not provide an actual solution to the root cause of data corruption by preventing writing of stale data. Such an approach causes an unfortunate tradeoff, as the waiting period to avoid data corruption also extends host failover time. A host may have to wait 10 s of seconds or even 100+ seconds. A host's inability to retry outstanding commands during the waiting period may cause unacceptable delays.

B. Embodiments of Using Command Tags to Prevent Data Corruption

Described in the sections are embodiments of using command tags to prevent data corruption in a multi-path network. Implementation of the disclosed embodiments allows a host to detect a condition before attempting a retry of a command on a new path and also allows a controller to detect a processing status for each write command. Therefore, data corruption may be addressed efficiently to the root cause.

To provide a solution for data corruption, one may either allow a host to detect a condition before attempting to retry an IO command on a new path or allow a controller to detect a condition as it begins processing each IO command. Allowing a host to detect a condition for correction may require an approach "Shoot the Other Node in the Head" (STONITH), also known as "Shoot the Other Controller in the HEAD" (STOCITH). The challenge with this approach is that it requires the host to determine when a disruptive step is actually necessary.

Allowing a controller to detect a condition may also allow the controller to silently prevent data corruption from occurring without requiring the host to do any explicit error recovery for this type of scenario. In one or more embodiments, such an approach may be achieved by adding a command tag (CT) to a write command from the host. The NVMe NVM command set specification (Revision 1.0a, Jul. 23, 2021) specifies a write command that writes data and metadata, if applicable, to I/O controller for logic blocks indicated. The NVMe NVM command set specification defines a 64-bit field for a Metadata Pointer (MPTR) in a write command, as shown in Table 1, below. In an NVMe-oF setting, a host, or more specifically a host with multipathing software installed, may embed an 8-byte CT into a write command by repurposing the MPTR field, which is defined for the Write command but is not currently supported for NVMe-oF. Although the MPTR field is used hereinafter as an exemplary place where a CT could be embedded in each command/submission queue entry (SQE), one skilled in the art shall understand that there are other ways or places that the CT value could be embedded in each in each command/submission queue entry (SQE). These alternative ways or places for CT embedding shall also be within the scope of the invention.

TABLE 1

Write - Metadata Pointer

| Bits | Description |
|---|---|
| 63:00 | Metadata Pointer (MPTR): This field contains the Metadata Pointer, if applicable. Refer to the Common Command Format figure in the NVMe Base Specification for the definition of this field. |

The NVMe Base Specification (Revision 2.0a, Jul. 23, 2021) explicitly highlights in Section 2.2 Message-Based Transport Model that NVMe over Fabrics does not support transferring metadata from a separate buffer, e.g., does not support the MPTR field.

Considering that the Metadata Pointer (MPTR) is a 64-bit field, if the MPTR field is used as a command tag (CT) to track on a per Host and Controller basis, such tracking would allow a single host to use a unique CT for each command at a rate of 1 Billion input/output operations per second (IOPS) and not run out of CTs for about 584 years. It shall be noted that because each host may attempt to create one or more queues per CPU core which may support one or more threads, the 8-byte CT field may be broken down into multiple ranges, with each range assigned to a core to avoid a need to synchronize the CT values across all cores. In an example of 1 k cores (assuming one thread per core) with each core having access to four controllers, CTs may still be enough for consumption at a rate of 1 million IOPS for 136 years. In one or more embodiments, a subsequent command may have a CT larger than a previous command such that the commands from the host may be easily tracked for processing status. Alternatively, a subsequent command may have a CT less than a previous command. When a host has to send a retry write command via a different path, the retry command has the same CT as the original command, as described in detail below.

Figure 4:
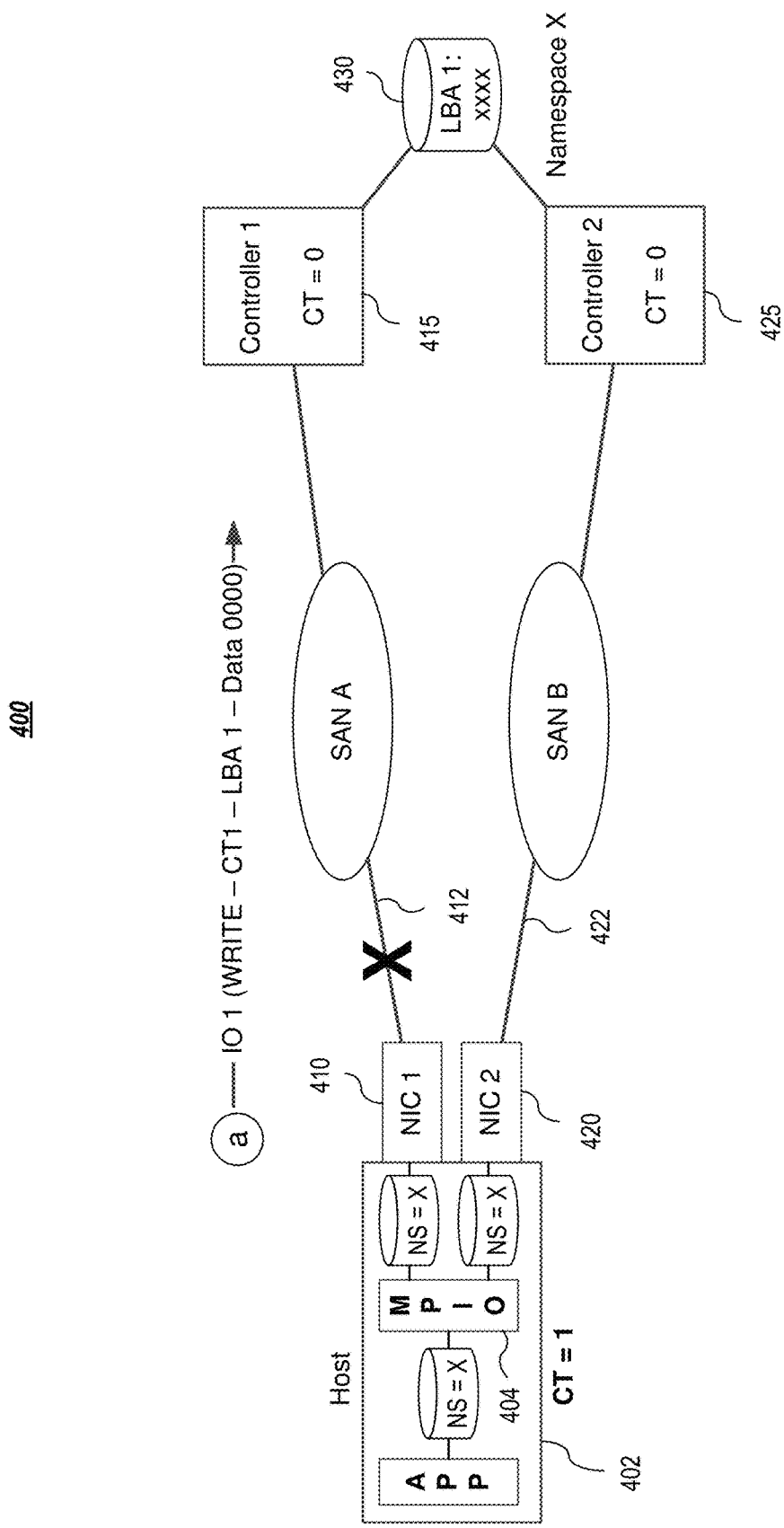
FIG. 4 graphically depicts a multi-path network having a first path down after a host sends a write command comprising a command tag to a controller, according to embodiments of the present disclosure.

FIG. 4 graphically depicts a multi-path network having a first path down after a host sends a write command comprising a command tag (CT) to a controller, according to embodiments of the present disclosure. The host 402 has MPIO software 404, e.g., PowerPath™ installed to support load balancing and path failover between a first NIC 410 and a second NIC 420. The host 402 may access an NVM subsystem, e.g., a Namespace X 430, via a first path 412 between the first NIC 410 and a first controller 415 or a second path 422 between the second NIC 420 and a second controller 425. The first controller 415 and the second controller 425 are both associated with the same NVM subsystem for access control via the first path and the second path, respectively. The first controller 415 and the second controller 425 may be NVMe controllers that support NVMe interface specification for accessing non-volatile storage medium or media. In one or more embodiments, the first path 412 may involve a first SAN, which may also be referred to as "SAN A" as shown in FIG. 4, and the second path 422 may involve a second SAN, which may also be referred to as "SAN B" as shown in FIG. 4.

Figure 5:
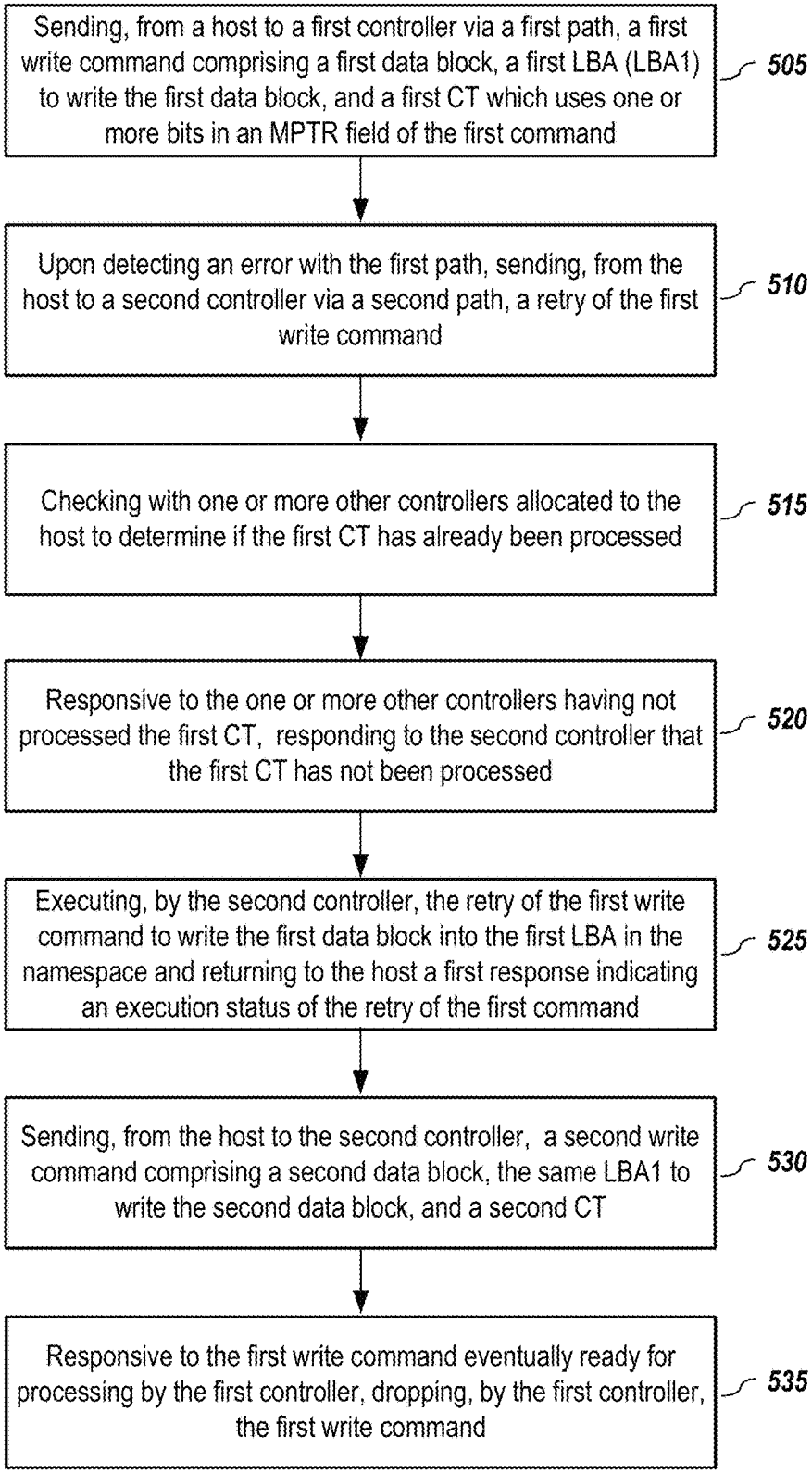
FIG. 5 depicts a process of command tag handling in a multi-path NVMe over Fabrics (NVMe-oF) environment, according to embodiments of the present disclosure.

FIG. 5 depicts a process of command tag handling among multi paths, according to embodiments of the present disclosure. Steps in FIG. 5 may also be graphically depicted in other figures, such as in FIG. 4 and FIG. 6-10. In step 505, the host 402 sends, via the first path 412, a first write command (IO 1) to a first controller 415. The first write command IO 1 comprises a first data block (e.g., "0000"), a first logical block address (LBA) indicating where to write the first data block, and a first CT (CT1) which uses one or more bits in the MPTR field (or in another field) of the first write command. The CT1 may be used by all controllers coupled to the host 402 to track processing statuses of any commands comprising the CT1. Sometime after the first write command IO 1 was sent, but before the first controller 415 responds with a status for the command, the host 402 notices the first path 412 has dropped or failed, as graphically depicted in FIG. 4.

In one or more embodiments, before using CTs in commands, a host may need to determine if controllers allocated to the host are able to support the feature of CT. If yes, the host may explicitly indicate that CTs will be used via a new feature used with a Set Features command. Once the controllers allocated to that host for a specific NVMe subsystem send back a response agreeing to use CTs, the controllers initialize a listing of processed CTs, which may be an empty list initially (shown as CT0 in FIG. 4). The host may begin to incorporate CTs in write commands for the NVMe subsystem. With the incorporation of CT in write commands, the host may then retry a command immediately without any delay or timeout.

Figure 6:
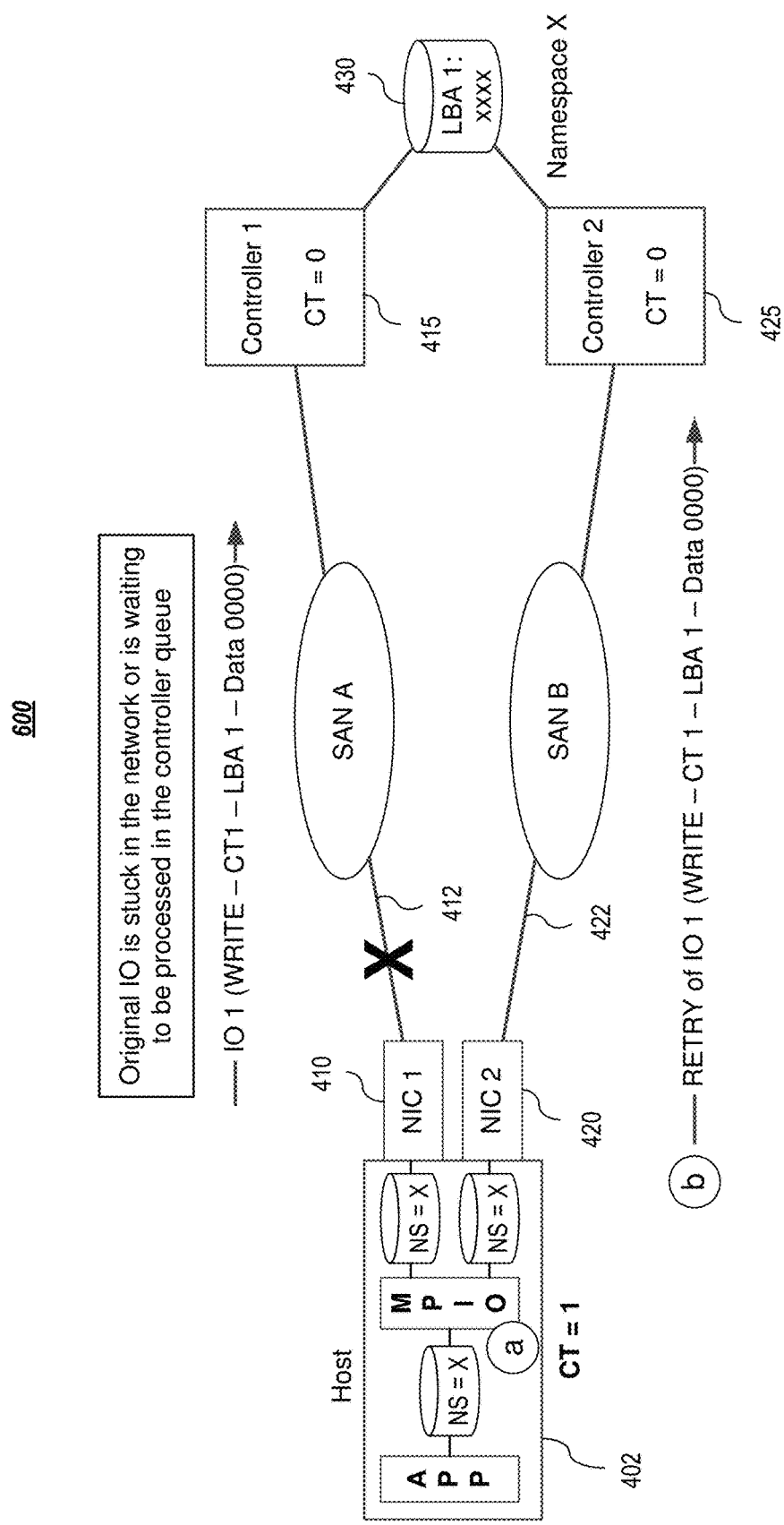
FIG. 6 graphically depicts the host re-sending the write command with the same command tag on a second path to a second controller, according to embodiments of the present disclosure.

In step 510, also graphically depicted in FIG. 6, once the host 402 detects an error with the first path (e.g., the path is down), the host 402 sends a retry of the first write command IO 1 on the second path 422 to the second controller 425. Unbeknownst to the host, the first write command IO 1 is still in flight (e.g., stuck in a queue on the original path). The retry of the first write command IO 1 comprises the first data block (e.g., "0000"), the first LBA (LBA 1), and a CT the same as the first CT.

In one or more embodiments, the retry of the first write command may be prepared by the MPIO software 404, which sets a command retry flag in a retry command as a retry identification and ensures that the retry command uses the same CT value (e.g., CT1) as the first write command IO 1. Once the retry of the IO 1 is ready, the host 402 sends the retry of the first write command IO 1 to the second controller 425 via the second NIC 420.

Figure 7:
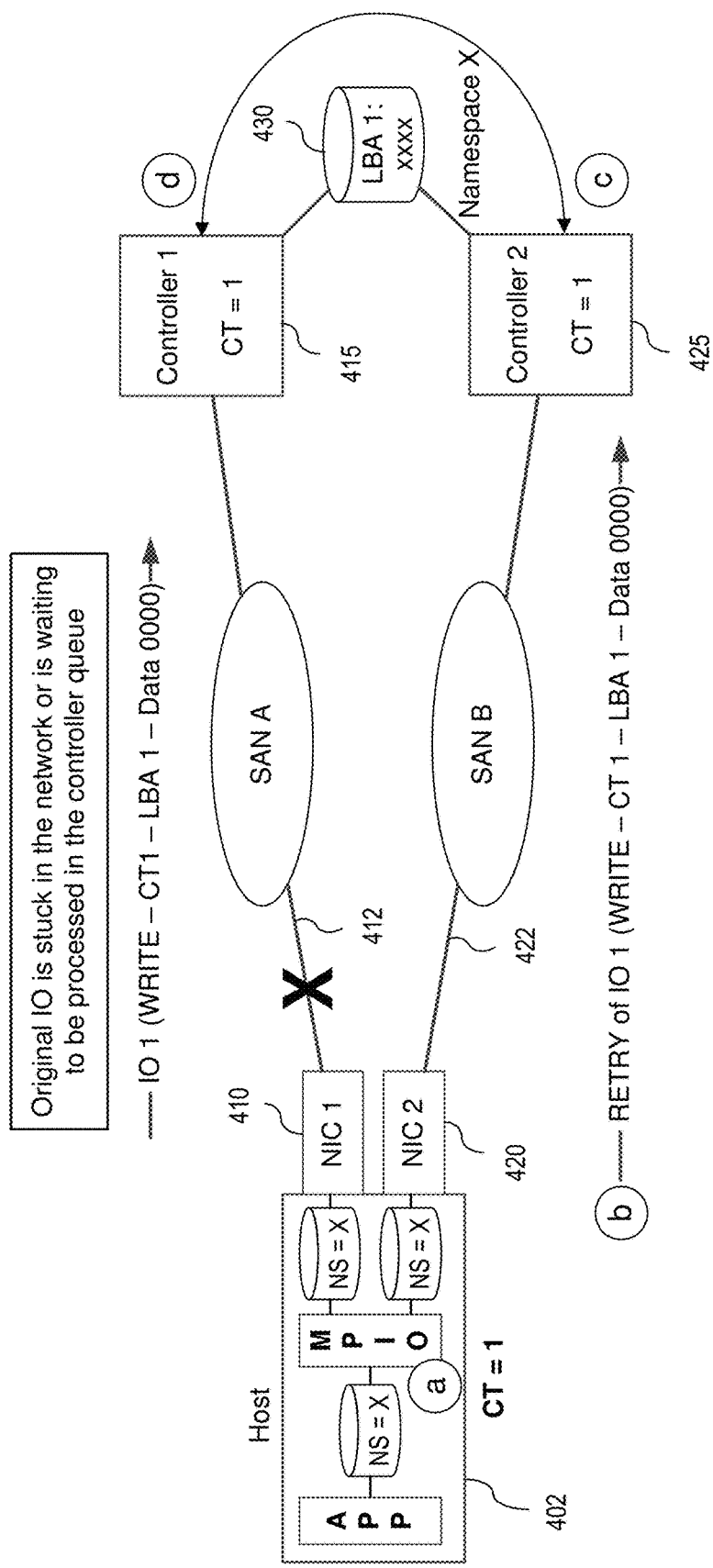
FIG. 7 graphically depicts the second controller incrementing its command tag value and checking with the other controllers associated with this host, according to embodiments of the present disclosure.

In step 515, which is graphically depicted in FIG. 7, after the second controller 425 ensures that it has not processed a command having the first CT, the second controller checks with one or more other controllers allocated to the host, including the first controller 415, to determine whether the first CT has already been processed or whether they have processed a prior write command comprising the same first CT.

In step 520, also graphically depicted in FIG. 7, responsive to the one or more other controllers having not processed the first CT, the one or more other controllers respond to the second controller that they have not processed the first CT and will not process (or execute) any write commands comprising the first CT for a set time period, e.g., 1 hour.

Figure 8:
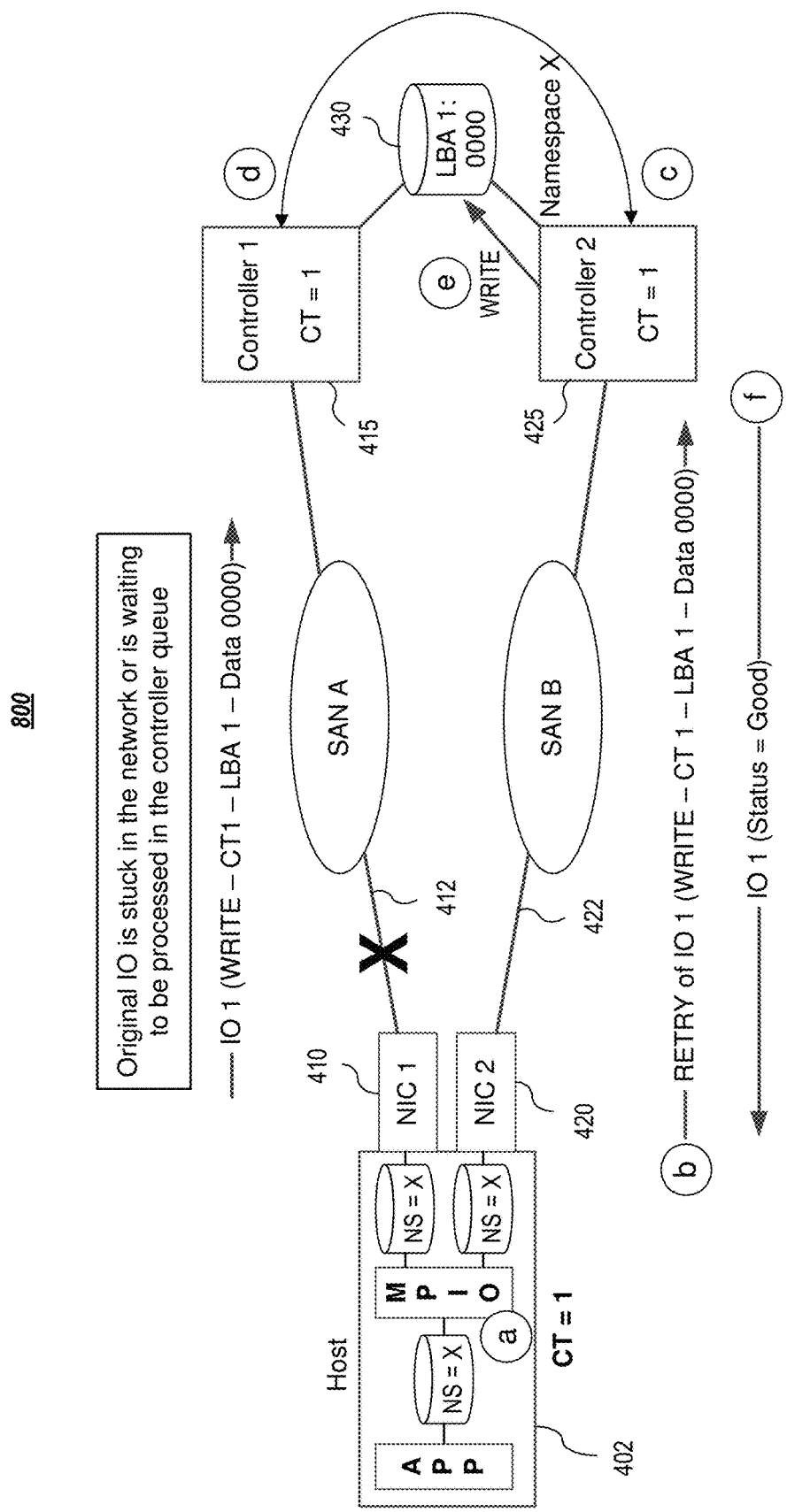
FIG. 8 graphically depicts the second controller implementing the writing command and returning a response, according to embodiments of the present disclosure.

In step 525, which is graphically depicted in FIG. 8, the second controller executes the retry of the first write command to write and the first data block at the first LBA in the namespace X 430, updates its listing of processed CTs by adding the first CT, and returns to the host a first response indicating an execution status (e.g., good) of the retry of the first write command.

In one or more embodiments, after the second controller executes the retry of the first write command, the second controller may send a notification to one or more other controllers allocated to the host such that the one or more other controllers may also update the respective listing of CTs that have been processed. In one or more embodiments, before the second controller 425 executes the retry of the first write command, other controllers allocated to the host, e.g., the first controller 415, may have been notified not to process a command with the CT from the original first write command.

Figure 9:
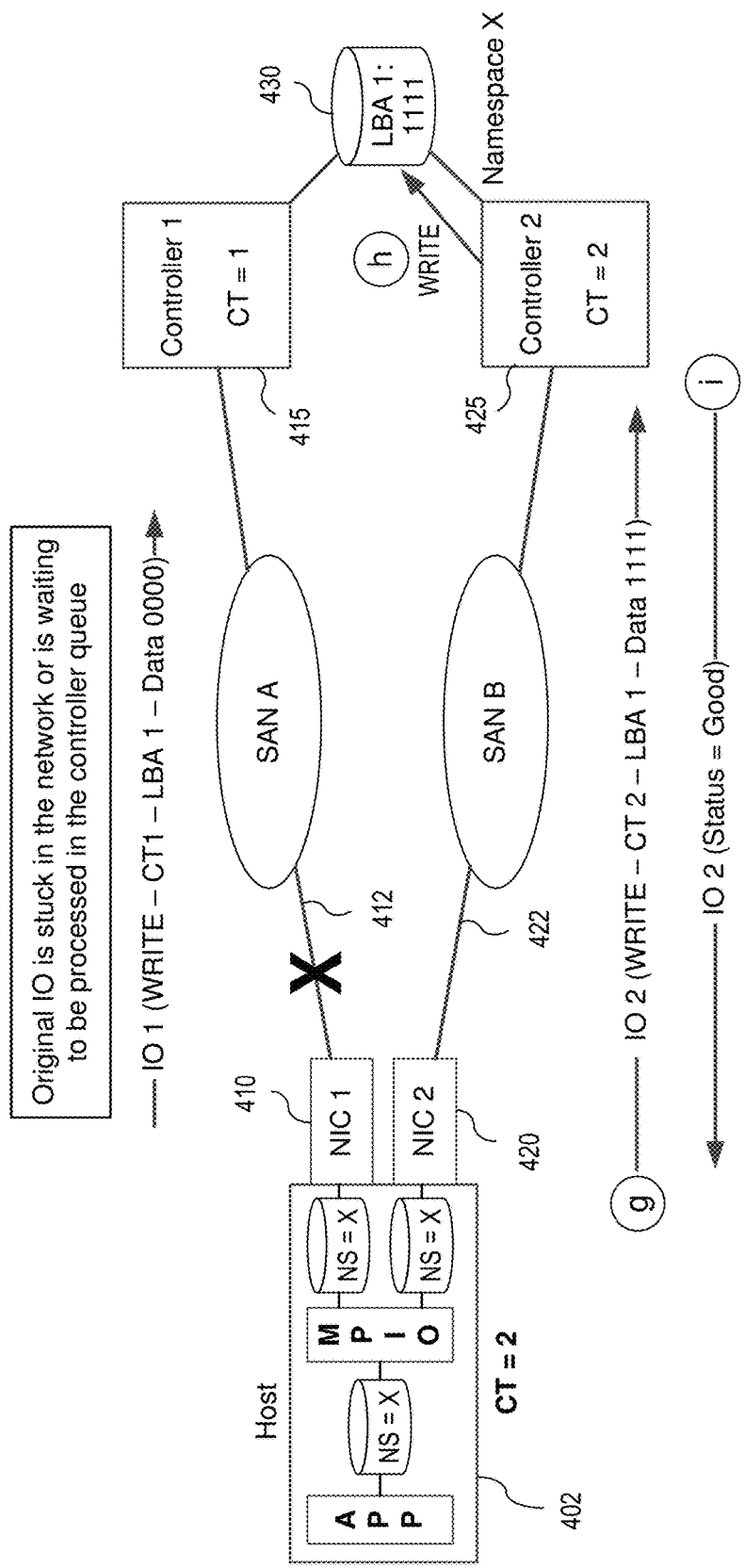
FIG. 9 graphically depicts the host sending a subsequent command comprising an updated command tag, according to embodiments of the present disclosure.

In step 530, which is graphically depicted in FIG. 9, once the retry of the first write command is executed, the host sends a second command (IO2) comprising a second data block (e.g., "1111"), the first logical block address (LBA) indicating where to write the second data block, and a second CT (CT2) which uses one or more bits in the MPTR field of the second command. Since the second command does not have a command retry flag set, the second controller will not check with one or more other controllers allocated to the host regarding the processing status of the second command. Instead, after the second controller determines that it has never processed the second CT previously, the second controller executes the second command to write the second data block at the first LBA in the namespace X 430, and returns to the host a second response indicating an execution status (e.g., good) of the second command.

Figure 10:
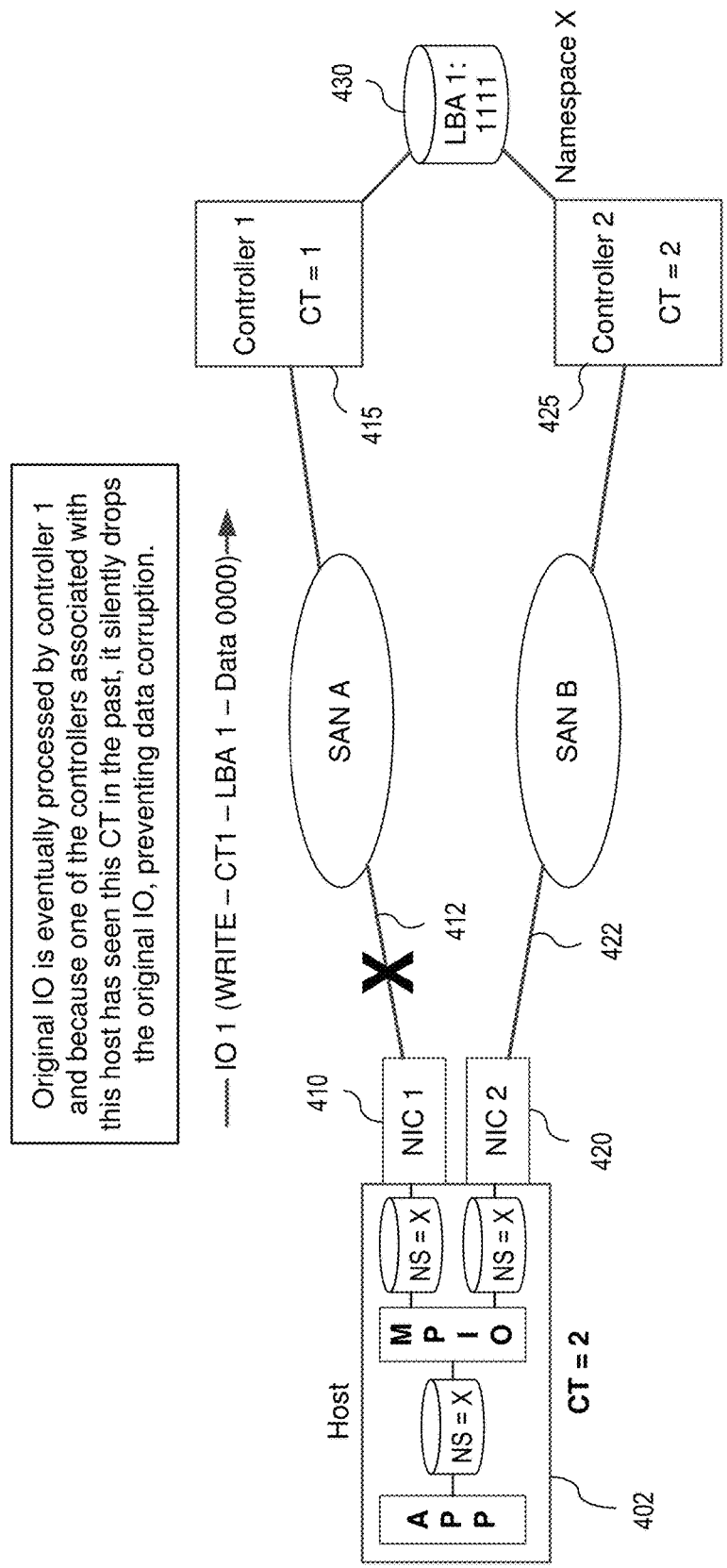
FIG. 10 graphically depicts the write command dropped by the first controller without overwriting the subsequent command, according to embodiments of the present disclosure.

In step 535, which is graphically depicted in FIG. 10, responsive to the first write command being eventually delivered to the first controller or ready for processing at the first controller, the first write command is dropped by the first controller without execution because the first CT is in the first controller's listing of processed CTs already, or because the first controller has promised not to process any write commands comprising the first CT within the set time period. In other words, a command comprising the first CT has already been processed by a controller that is associated with the host. Therefore, the second data block (e.g., "1111") written in the first LBA in the namespace X 430 data will not be overwritten with the first data block from the first write command. Therefore, data corruption shown in FIG. 3 is solved to the root cause.

Figure 11:
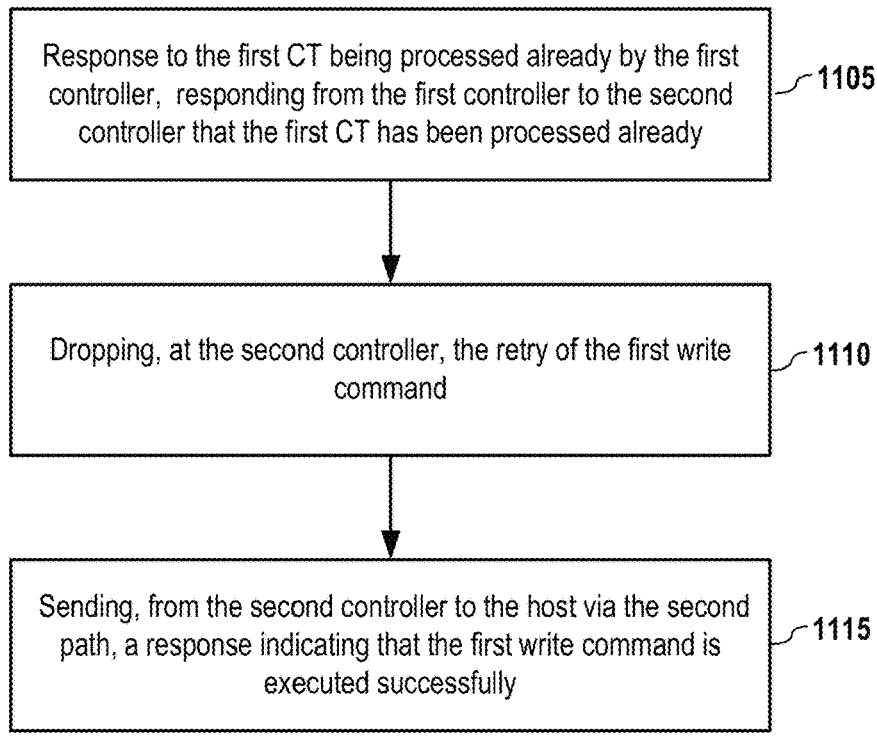
FIG. 11 depicts an alternative process of command tag handling among multi-paths, according to embodiments of the present disclosure.

In one or more embodiments, when the first path is down and the host sends a retry of the first write command via the second path to the second controller, the first controller may have executed the first write command already and thus added the first CT into the first controller's listing of processed CTs. However, since the first link is down, the first controller cannot send back to the host a response indicating an execution status (e.g., good) of the first write command. FIG. 11 depicts an alternative process of command tag handling among multiple paths, according to embodiments of the present disclosure. In step 1105, responsive to the first CT being processed by the first controller already, the first controller responds to the second controller that the first CT has been processed already. In step 1110, upon receiving the response from the first controller, the second controller drops the retry of the first write command without execution. In step 1115, the second controller sends back to the host via the second path a response indicating that the first write command has been executed successfully such that the host may start sending subsequent write commands to the second controller. Therefore, data corruption may also be solved to the root cause. In one or more embodiments, the response sent by the second controller may just indicate that the first write command has been executed successfully without including an identification (ID) of a controller that executed the first write command. Alternatively, or additionally, one or more other communications may include information, such as the controller identification (ID) and/or other information about the first IO.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 12:
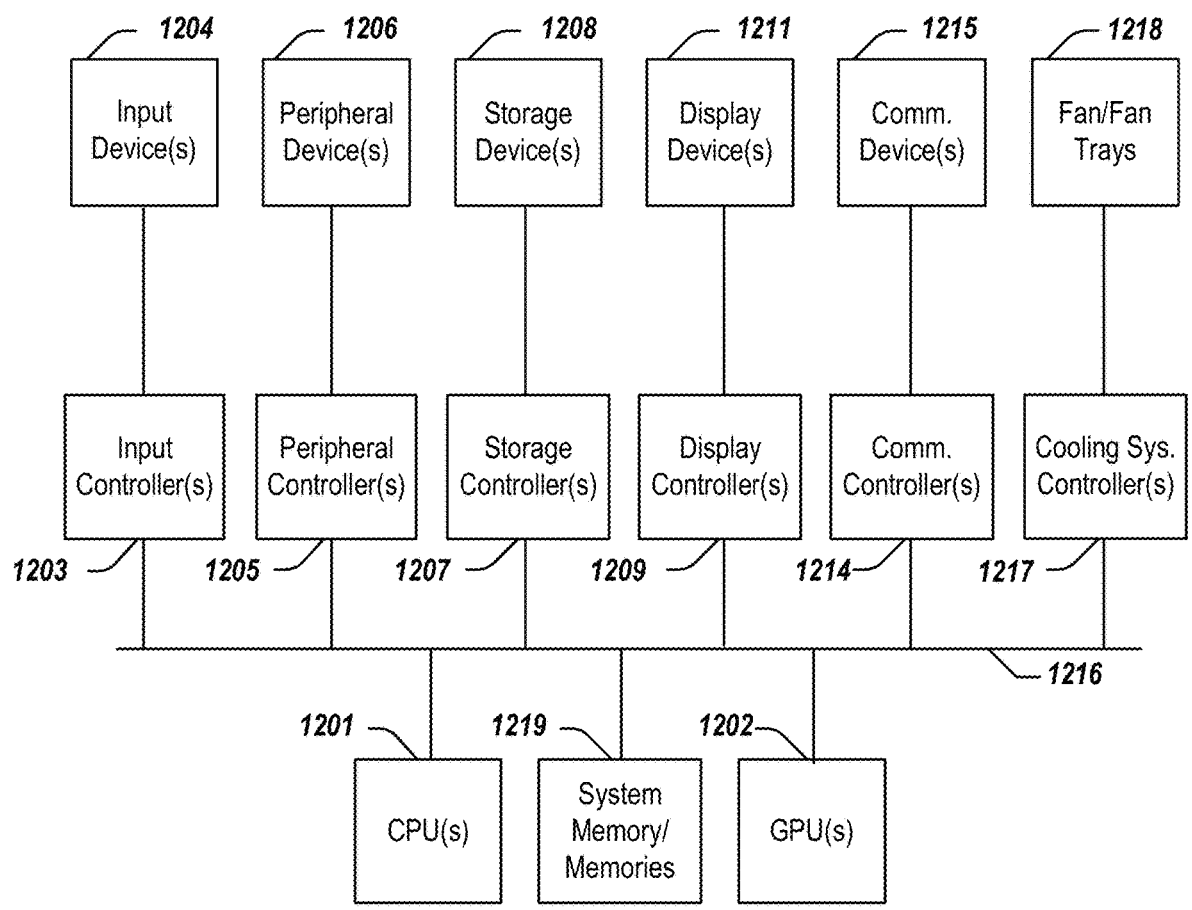
FIG. 12 depicts a simplified block diagram of an information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more CPUs 1201 that provides computing resources and controls the computer. CPU 1201 may be implemented with a microprocessor or the like and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204, such as a keyboard, mouse, touchscreen, stylus, microphone, camera, trackpad, display, etc. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fibre Channel over Ethernet (FCOE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 13:
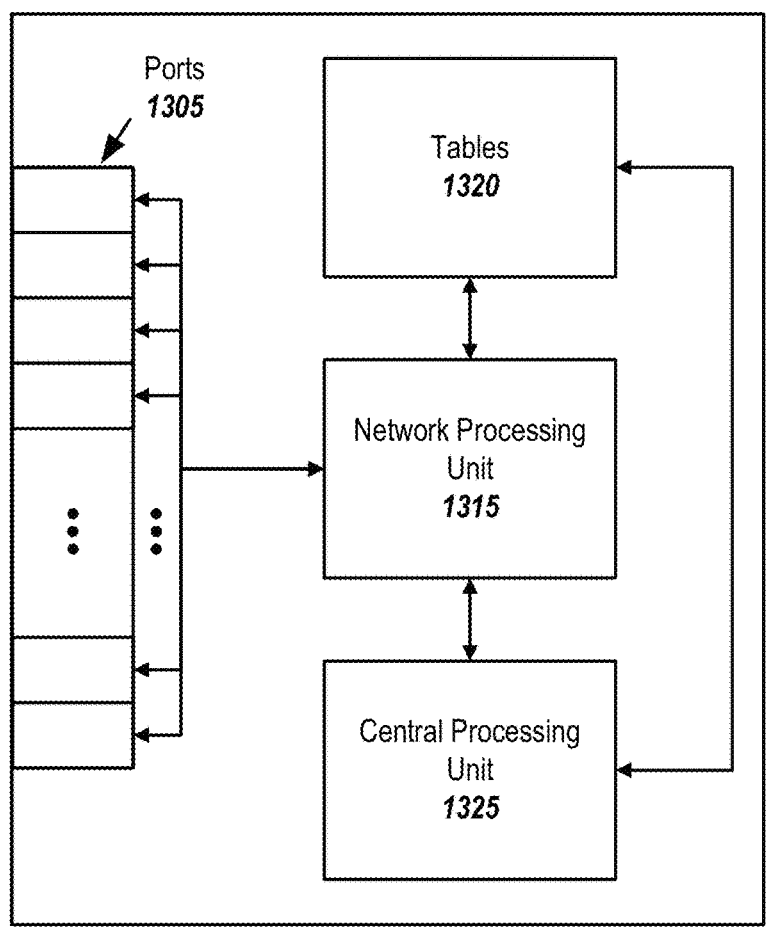
FIG. 13 depicts an alternative block diagram of an information handling system, according to embodiments of the present disclosure.

FIG. 13 depicts an alternative block diagram of an information handling system, according to embodiments of the present disclosure. It will be understood that the functionalities shown for system 1300 may operate to support various embodiments of the present disclosure—although it shall be understood that such system may be differently configured and include different components, additional components, or fewer components.

The information handling system 1300 may include a plurality of I/O ports 1305, a network processing unit (NPU) 1315, one or more tables 1320, and a CPU 1325. The system includes a power supply (not shown) and may also include other components, which are not shown for sake of simplicity.

In one or more embodiments, the I/O ports 1305 may be connected via one or more cables to one or more other network devices or clients. The network processing unit 1315 may use information included in the network data received at the node 1300, as well as information stored in the tables 1320, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with one or more sequences of instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method for handling data in a multi-path non-volatile memory express (NVMe) over Fabrics (NVMe-oF) environment, the computer-implemented method comprising:
    responsive to receive at a controller a write command with a retry flag set:
        determining, based upon a command tag in the write command, whether the write command has been previously processed at the controller; and
        responsive to the write command not having been previously processed at the controller:
            checking with one or more other controllers that may have received a prior write command comprising the command tag whether they have processed the prior write command; and
            responsive to the prior write command not having been processed by any of the one or more other controllers:
                executing, at the controller, the write command;
                updating a list of command tags that have been processed by the controller with an addition of the command tag in the write command; and
                sending, from the controller to a host, a response indicating that the write command has been successfully completed.

2. The processor-implemented method of claim 1 further comprising:
    updating, at each of the one or more other controllers, a listing of command tags that have been processed by adding the command tag; and
    not processing at the one or more other controllers any write commands comprising the command tag for a set time period.

3. The processor-implemented method of claim 1 further comprising:
responsive to the prior write command having been processed by one of the one or more other controllers, performing, by the controller, steps comprising:
dropping the write command; and
updating its listing of command tags that have been processed to include the command tag.

4. The processor-implemented method of claim 1 wherein the command tag is embedded in a field in the write command.

5. The processor-implemented method of claim 1 wherein the retry flag is set, using a multi-path I/O (MPIO) software in the host, in the write command.

6. The processor-implemented method of claim 1 further comprising:
confirming, by the host, that any controllers allocated to the host support command tags before sending any write commands comprising command tags.

7. A processor-implemented method for handling data in a multi-path non-volatile memory express (NVMe) over Fabrics (NVMe-oF) environment, the computer-implemented method comprising:
responsive to detecting that a first link between a host and a first controller, to which the host sent a first write command comprising a first command tag, has failed:
sending, from the host via a second link to a second controller, a retry of the first write command that comprises a retry flag and a command tag same as the first command tag.

8. The processor-implemented method of claim 7 wherein the first command tag is embedded in a field in the first write command.

9. The processor-implemented method of claim 7 wherein the retry flag is set, using a multi-path I/O (MPIO) software in the host, in the retry of the first write command.

10. The processor-implemented method of claim 7 further comprising:
determining whether the first write command has been previously processed by any controllers, including the first controller and the second controller, allocated to the host; and
responsive to the first write command not having been previously processed, executing, at the second controller, the retry of the first write command.

11. The processor-implemented method of claim 7 further comprising:
determining whether the first write command has been previously processed by any controllers, including the first controller and the second controller, allocated to the host; and
responsive to the first write command having been previously processed by the first controller, dropping, at the second controller, the retry of the first write command.

12. The processor-implemented method of claim 11 further comprising:
sending, from the second controller to the host via the second link, a response indicating that the first write command is executed successfully.

13. The processor-implemented method of claim 10 further comprising:
confirming, by the host, that any controllers allocated to the host are able to support command tags before sending any write commands comprising command tags.

14. A non-transitory information-handling-system-readable medium or media comprising one or more sequences of instructions which, when executed by one or more processors, causes steps to be performed comprising:
responsive to detecting that a first link between a host and a first controller, to which the host sent a first write command comprising a first command tag, has failed:
sending, from the host via a second link to a second controller, a retry of the first write command that comprises a retry flag and a command tag same as the first command tag.

15. The non-transitory information-handling-system-readable medium or media of claim 14 wherein the first command tag is embedded in a field in the first write command.

16. The non-transitory information-handling-system-readable medium or media of claim 14 wherein the retry flag is set in the retry of the first write command.

17. The non-transitory information-handling-system-readable medium or media of claim 16 wherein the first link is between a first network interface controller (NIC) of the host and the first controller, the second link is between a second NIC of the host and the second controller.

18. The non-transitory information-handling-system-readable medium or media of claim 17 wherein the host has a multi-path I/O (MPIO) software to support load balancing and path failover between the first NIC and the second NIC.

19. The non-transitory information-handling-system-readable medium or media of claim 14 further comprises one or more sets of instructions which, when executed by at least one of the one or more processors, causes steps to be performed comprising:
responsive to receiving from the second controller a response indicating that the retry of the first write command is completed successfully:
sending from the host to the second controller a subsequent write command that comprises a second command tag different from the first command tag.

20. The non-transitory information-handling-system-readable medium or media of claim 14 further comprises one or more sets of instructions which, when executed by at least one of the one or more processors, causes steps to be performed comprising:
before sending any write commands comprising command tags, confirming that any controllers allocated to the host are able to support command tags.

* * * * *